(12) United States Patent
Donlin et al.

(10) Patent No.: US 8,775,987 B1
(45) Date of Patent: Jul. 8, 2014

(54) GENERATION OF A REPLAY MODULE FOR SIMULATION OF A CIRCUIT DESIGN

(71) Applicant: Xilinx, Inc., San Jose, CA (US)

(72) Inventors: Adam P. Donlin, San Jose, CA (US); Kyle Corbett, Campbell, CA (US)

(73) Assignee: Xilinx, Inc., San Jose, CA (US)

( * ) Notice: Subject to any disclaimer, the term of this patent is extended or adjusted under 35 U.S.C. 154(b) by 0 days.

(21) Appl. No.: 13/946,137

(22) Filed: Jul. 19, 2013

(51) Int. Cl.
G06F 17/50 (2006.01)

(52) U.S. Cl.
USPC .......................................... 716/106

(58) Field of Classification Search
USPC .................................. 716/100, 106
See application file for complete search history.

(56) References Cited

U.S. PATENT DOCUMENTS

| | | | |
|---|---|---|---|
| 2005/0071791 A1* | 3/2005 | Buckley, Jr. | 716/4 |
| 2008/0172217 A1* | 7/2008 | Morizawa | 703/13 |
| 2008/0288234 A1* | 11/2008 | Nelson et al. | 703/22 |

* cited by examiner

*Primary Examiner* — Suchin Parihar
(74) *Attorney, Agent, or Firm* — LeRoy D. Maunu (57) ABSTRACT

Approaches are disclosed for testing a module of a circuit design. The module is simulated a first time using a testbench on a programmed processor. Event data is captured to a first file during the simulating. For each event, the event data describes a signal identifier, an associated signal value, and an associated timestamp. The event data of the first file is transformed into a hardware description language (HDL) replay module.

20 Claims, 6 Drawing Sheets

GENERATION OF A REPLAY MODULE FOR SIMULATION OF A CIRCUIT DESIGN

TECHNICAL FIELD

The disclosure generally relates to testing of a module of a circuit design.

BACKGROUND

Modern integrated circuits (ICs) are developed through the use of hardware description languages (HDLs). HDLs such as VERILOG, VHDL, and the like allow developers to create software-based representations of circuit designs. One advantage of using an HDL is the potential for code reuse from one design to another. This concept has been realized with the commercial availability of intellectual property (IP) cores.

In general, an IP core (hereinafter core or module) refers to a software representation of a semiconductor component that provides a processing function. Different varieties of cores exist. For example, some cores can provide basic functions. These cores can be included in a circuit design or, alternatively, can be used as subcomponents within a larger, more complex core. Another variety of cores can function as a logic bridge to software-based bus objects such as Peripheral Component Interconnect (PCI) and/or Advanced Microcontroller Bus Architecture (AMBA) busses.

Some cores are highly configurable and prior to release undergo extensive testing to verify whether or not the core is functionally correct. A common approach to verification of a core is with a testbench. A testbench, also referred to as a verification environment, provide test stimuli and verify the behavior of a design under test, in this case one or more cores. Generating a testbench involves describing the connections, events, and test vectors for different combinations of transactions involving the core(s). A testbench also refers to the code used to create a pre-determined input sequence to the cores, as well as the code responsible for observing the response.

A core may undergo a number of transformations in the process of incorporating the core into a larger design and implementing the final product. Initially, the core may be customized according to the requirements of the target application. For example, the core may be customized in terms of data width, data rate, etc. The customization of an IP core may be governed by a specific set of parameters and rules that define how the parameters are translated into values for the core's HDL parameters. In later stages, the core may be synthesized, and the resulting netlist optimized, placed and routed.

At each stage it would be desirable to verify that no errors have been introduced into the core. If an error is discovered only after the circuit has been implemented, identifying the source of and fixing the error may be extremely expensive and time consuming. Also, in some instances, extra licensing fees may be incurred for the use of different simulation tools at different stages of the design process.

SUMMARY

In one embodiment, a method of testing a module of a circuit design is provided. The method includes simulating the module a first time using a testbench on a programmed processor. Event data is captured to a first file during the simulating. For each event the event data describes a signal identifier, an associated signal value, and an associated timestamp. The event data of the first file is transformed into a hardware description language (HDL) replay module.

In another embodiment, a system of testing a module of a circuit design includes a processor and a memory arrangement coupled to the processor. The memory arrangement is configured with program code, and the program code when executed by the processor, causes the processor to simulate the module a first time. Event data is captured to a first file during the simulating. For each event, the event data describes a signal identifier, an associated signal value, and an associated timestamp. The event data of the first file is transformed into a hardware description language (HDL) replay module. In subsequent implementation phases, the module is simulated using the replay module.

In further embodiments, the method and system simulate the module a second time using the replay module and capturing event data to a second file during the second simulating. The method and system determine whether or not the event data in the first file matches the event data in the second file. Data is output to indicate whether or not the event data in the first file matches the event data in the second file.

Other features will be recognized from consideration of the Detailed Description and Claims, which follow.

BRIEF DESCRIPTION OF THE DRAWINGS

Various aspects and features of the method and system will become apparent upon review of the following detailed description and upon reference to the drawings, in which.

DETAILED DESCRIPTION

Various approaches for testing a core or module of a circuit design are disclosed. One testing method includes simulating the desired module a first time using a testbench. Changes in the values of signals of the module that occur during the simulation are captured to a baseline results file. The data captured to the file may then be transformed into a hardware description language (HDL) replay module.

The HDL replay module may then be used in verifying proper behavior of the module in subsequent implementation phases of the design process. For example, the replay module may be synthesized along with the module under test, and the synthesized module under test may be simulated using the replay module to drive input signals to the module under test. Changes in the values of signals of the module that occur during the simulation of the synthesized module are captured to another results file. The other results file may then be compared to the baseline results file to determine whether or not the results of simulating with the initial replay module match the results of simulating with the synthesized replay module. This process may then be repeated for subsequent implementation stages such as optimization, placing, and routing.

Figure 1:
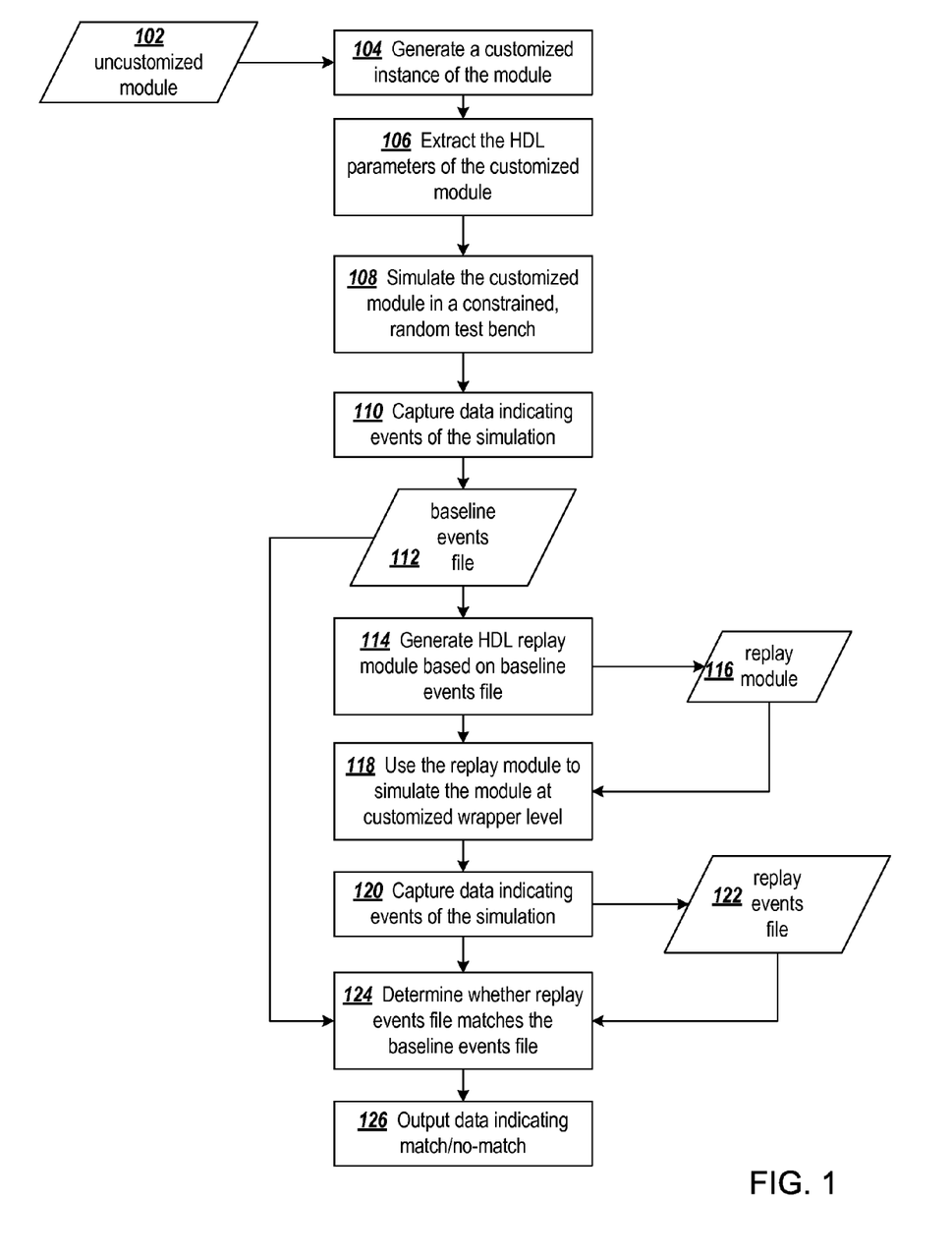
FIG. 1 is a flowchart of a process for verification of a module using a replay module.

FIG. 1 is a flowchart of a process for verification of a module using a replay module. Block 104 generates a customized instance of an uncustomized module 102. The uncustomized module may be a core selected by a designer and customized for use as a component in a larger circuit design. The customized instance may include values of parameters as specified by the designer.

Some tools isolate the designer from the details of the hardware description language (HDL) implementation of the cores that are available for use in a circuit design. Such tools may further support the customization of the parameter values in a manner that hides the actual HDL parameter values of the underlying core. At block 106, the values of those HDL parameters are extracted from the customized module, and the extracted HDL parameter values are used to create an HDL wrapper around the module.

At block 108, the customized HDL module (with the wrapper) is simulated in a constrained, random testbench. The simulation input may be constrained to ranges or distributions of values, and the values may be generated pseudo-randomly subject to the constraints. The results of the simulation are captured at block 110 and stored as events in a baseline events file 112. In an example implementation, the baseline events file may be a value change dump (VCD) file as recognized by those skilled in the art. A VCD file is in an ASCII-based format and includes a series of time-ordered value changes for the signals in a given simulation model. The VCD includes a sequence of timestamps and with each timestamp the signals whose values change are listed (e.g., value/id pair).

At block 114, an HDL replay module 116 is generated from the baseline events file. The HDL replay module contains a module declaration with output ports declared according to the ports of the module that should be driven during the test. The time-ordered port transition events from the baseline events file are re-created by writing the appropriate HDL statements into the body of the code block in the HDL replay module. The proper timing of the events is retained by inserting delay statements into the body of the HDL replay module. Though the replay module may become large, it is relatively simple to compile and inexpensive to execute during simulation.

Selection of the subset of data from the baseline results file for translation into the replay module is made based on the information carried in the header of the baseline results file. In the header, the port names, dimensions, and signal directions are declared. This information indicates those data items in the baseline results file to be added to the replay module as port assignments and delays. Example 1 below shows an example of a baseline results file.

$scope module testbench $end
$scope module DUT $end
$var port 1 <0 aclk $end
$var port 1 <1 aresetn $end
$var port 1 <2 aclken $end
$var port 1 <3 s_axis_tvalid $end
$var port 1 <4 s_axis_tready $end
$var port [23:0] <5 s_axis_tdata $end
$var port [2:0] <6 s_axis_tstrb $end
$var port [2:0] <7 s_axis_tkeep $end
$var port 1 <8 s_axis_tlast $end
$upscope $end
$upscope $end
$enddefinitions $end
0
$dumpports
pX 6 6 <4
pZ 0 0 <3
pZ 0 0 <8

Example 1

The correctness of the replay module may be verified, beginning at block 118. At block 118, the module under test (with the wrapper) is simulated using the replay module to drive input signals. At block 120, the simulation data is captured and stored as a VCD replay events file 122.

Block 124 determines whether or not the replay events file matches the baseline events file, and block 126 outputs data indicating whether the files match or do not match. Matching files indicates that the replay module is an accurate recreation of the base set of stimuli (from block 108), which were known to indicate proper functioning of the module.

The replay module offers several benefits. Since the replay module provides an accurate recreation of a set of randomized stimuli for which the module under test was known to pass, the replay module may be used at various stages of the implementation process. Also, since the replay module contains relatively primitive HDL statements it is easily compiled and efficient to run in simulators that do not support advanced testbench language constructs. Also, license fees may be saved because special simulators are not required to simulate the module with advanced testbench languages.

Figure 2:
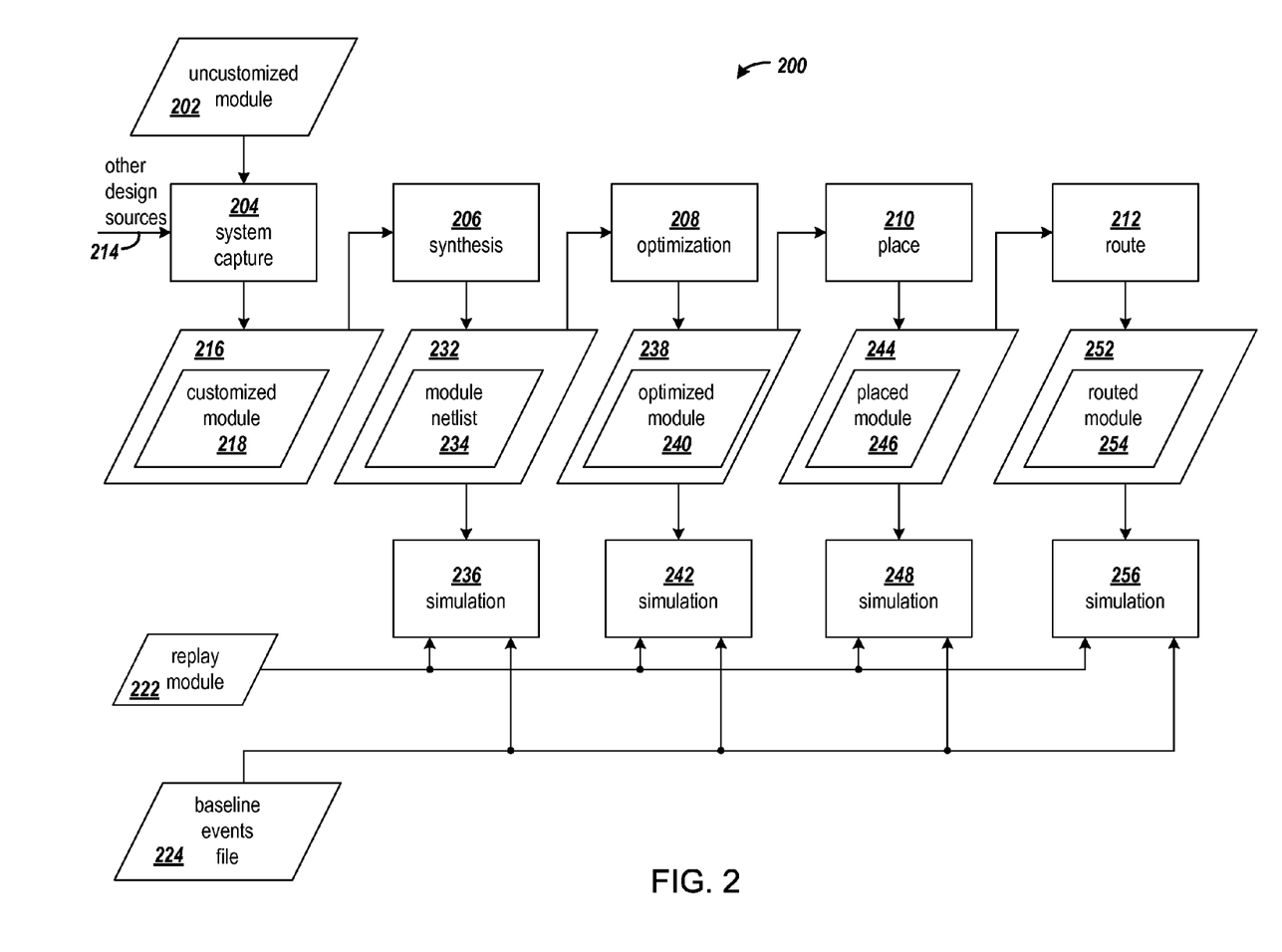
FIG. 2 is a dataflow diagram that shows use of the replay module in verification of a module in multiple stages of a design process.

FIG. 2 is a dataflow diagram that shows use of the replay module in verification of a module in multiple stages of a design process 200. The stages of the design process generally include system capture 204, synthesis 206, optimization 208, place 210, and route 212, as would be recognized by those skilled in the art. An uncustomized module 202 is input to a system capture tool 204. A designer operating a system capture tool can create a circuit design 216 by customizing the uncustomized module and using other design sources 214. Such other design sources include other cores and objects from a library of circuit design resources. Along with other design objects (not shown), the circuit design 216 includes customized module 218, which has designer-provided parameter values applied to the uncustomized module 202. Using the process described in FIG. 1, the baseline events file 224 may be generated by simulating the customized module 218 and the replay module 222, which was previously generated from the baseline events file.

The circuit design 216 and customized module 218 are synthesized in synthesis stage 206. The synthesized design 232 includes module netlist 234, which is the synthesized version of the customized module 218. The synthesized design and module netlist are input to a netlist simulation 236. The netlist simulation 236 performs the process shown in FIG. 3.

Figure 3:
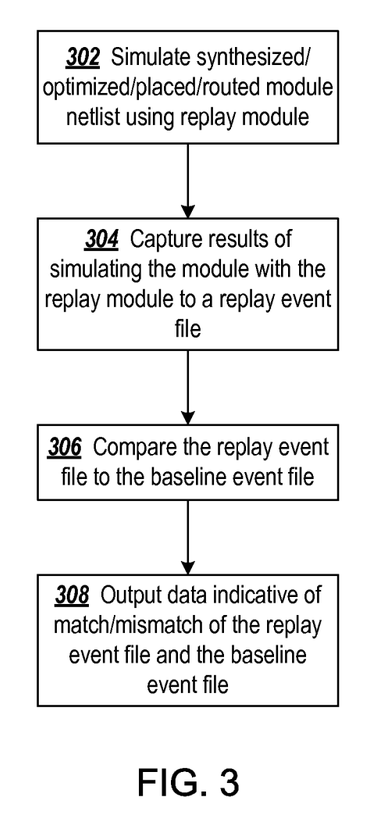
FIG. 3 is a flowchart of a process for simulating a module under test using a replay module and verifying whether or not simulation of the module under test produced correct results.

FIG. 3 is a flowchart of a process for simulating a module under test using a replay module and verifying whether or not simulation of the module under test produced correct results. The same general process of FIG. 3 is performed in each of the simulations 236, 242, 248, and 256 shown in FIG. 2, and the flowchart of FIG. 3 symbolizes the processing in each of those simulations.

At block 302, the module is simulated using the replay module. Depending on which of the simulations 236, 242, 248, and 256 is being performed, the module that is simulated is one of the modules having been synthesized, optimized, placed, or routed. The results of the simulation are captured to a replay event file at block 304. The replay event file may be a VCD file as described above.

The replay event file is compared to the baseline event file at block 306 to determine whether or not the results of the simulation in the current implementation phase (synthesis, optimization, place, or route) match the results of simulating the customized module (FIG. 1, block 108). At block 308, the process outputs data that indicates whether or not the replay events file matched the baseline events file.

Returning now to FIG. 2, following the synthesis stage 206, the circuit design may be submitted to optimization stage 208 for optimization. The result of optimization is an optimized netlist 238, which includes the optimized module 240. Optimized module 240 is an optimized netlist of the module under test. The simulation 242 simulates the optimized module 240 using the replay module 222 and determines whether or not the optimized module simulated correctly by comparing the generated replay events file to the baseline events file 224, as described in FIG. 3.

Following optimization, the circuit design may be submitted to stage 210 for placing the optimized netlist. A placed circuit design 244 is generated, and the placed circuit design includes placed module 246, which is a placed netlist version of the module under test. The simulation 248 simulates the placed module 246 using the replay module 222 and determines whether or not the placed module simulated correctly by comparing the generated replay events file to the baseline events file 224, as described in FIG. 3.

Following placement, the circuit design may be submitted to stage 212 for routing the placed netlist. A routed circuit design 252 is generated, and the routed circuit design includes routed module 254, which is a routed netlist version of the module under test. The simulation 256 simulates the routed module 254 using the replay module 222 and determines whether or not the routed module simulated correctly by comparing the generated replay events file to the baseline events file 224, as described in FIG. 3.

Figure 4:
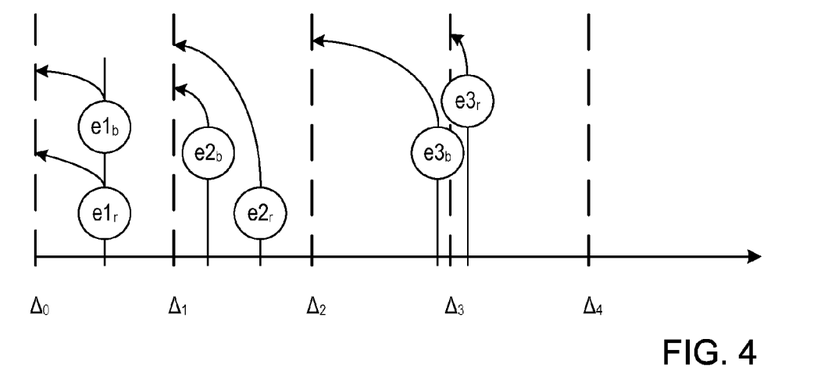
FIG. 4 is a timing diagram that shows how quantization times are used to determine whether events described in the baseline events file match corresponding events described in the replay events file.
Figure 5:
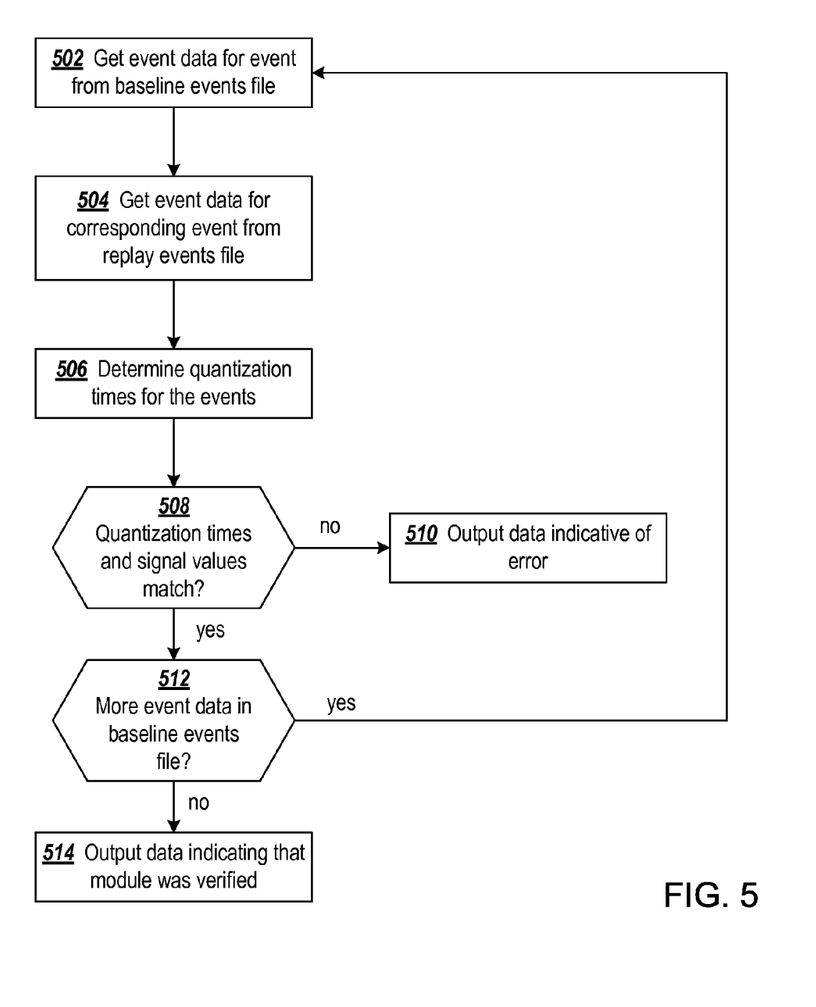
FIG. 5 is a flowchart of a process in which quantization times are used to determine whether events described in the baseline events file match corresponding events described in the replay events file.
Figure 6:
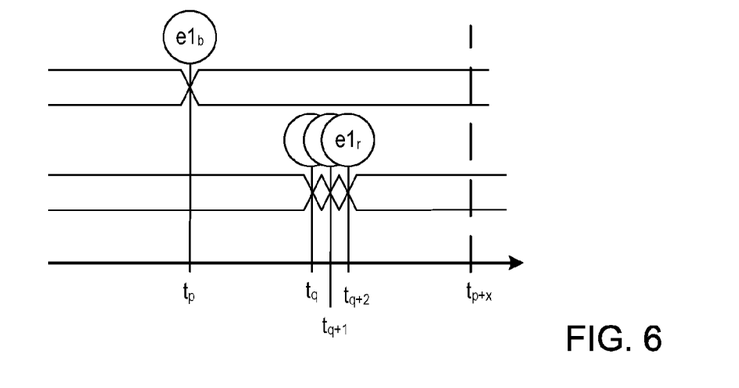
FIG. 6 is a timing diagram that shows how a window of time is used to determine whether events described in the baseline events file match corresponding events described in the replay events file.
Figure 7:
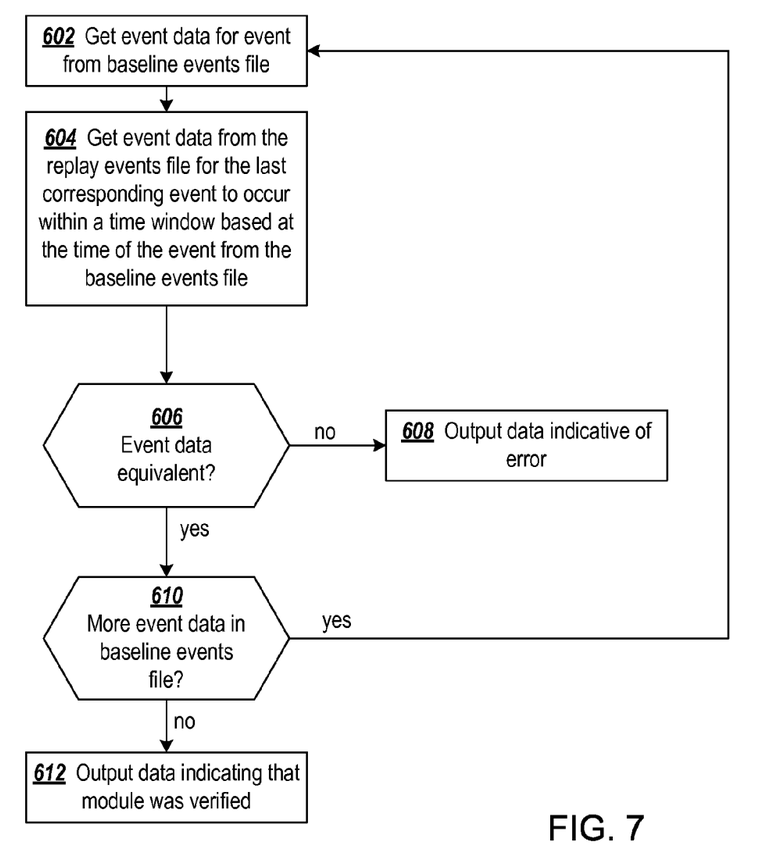
FIG. 7 is a flowchart of a process in which a window of time is used to determine whether events described in the baseline events file match corresponding events described in the replay events file.

The process of determining whether or not the baseline events file matches a replay events file involves determining whether the events in the replay events file match or correspond to the events in the baseline events file. Since the process may be applied at different stages of the design process, a direct comparison of value change timestamps and values may not be sufficient. As the module proceeds through the design process, the times of events may drift from the times of the corresponding events in the baseline events file. For example, additional simulated delays may occur in netlist style simulations as RTL statements are eventually mapped to logical primitives, which intrinsically have unit or back-annotated delays. The processes shown in FIGS. 5 and 7 show alternative approaches for matching events in the baseline events file to events in the replay events file. FIGS. 4 and 6 are timing diagrams of event scenarios that illustrate how the different approaches operate.

FIG. 4 is a timing diagram that shows how quantization times are used to determine whether events described in the baseline events file match corresponding events described in the replay events file. Events are snapped back to the beginning of the quantized time interval in which the events occur.

Corresponding events in the example have similar labels, with each event from the baseline events file having a label with a subscript b, and each event from the replay events file having a subscript r. The quantization times, which define constant intervals, are labeled $\Delta_0$, $\Delta_1$, $\Delta_2$, $\Delta_3$, and $\Delta_4$. In the example, event $e1_b$ and $e1_r$ are snapped back to time $\Delta_0$, and events $e2_b$ and $e2_r$ are snapped back to time $\Delta_1$. Events $e3_b$ and $e3_r$ are snapped to different times, $\Delta_2$ and $\Delta_3$, respectively. Since $e1_b$ and $e1_r$ are snapped back to the same time, and events $e2_b$ and $e2_r$ are snapped back to the same time, event $e1_b$ matches event $e1_r$, and event $e2_b$ matches event $e2_r$. Event $e3_b$ does not match event $e3_r$ since they snapped back to different times. In order for the replay events file to match the baseline events file, the timing of all the events in the baseline events file must match the timing of the corresponding events in the replay events file.

FIG. 5 is a flowchart of a process in which quantization times are used to determine whether events described in the baseline events file match corresponding events described in the replay events file. As the baseline events file and the replay events file are processed, the timestamped events are realigned to the beginning of the quantized time interval in which the events occur. This allows the timestamp and events to be directly compared because the baseline event and the replay event should snap back to the same time.

At block 502, event data for an event is obtained from the baseline events file, and at block 504, event data for a corresponding event (e.g., same value-identifier pair) is obtained from the replay events file. The quantization times for the events are determined at block 506. As shown in FIG. 4, the quantization time is the beginning ($\Delta_t$) of the time interval in which the event occurs.

If the quantization times are different or the signal values as indicated by the event data do not match, decision block 508 directs the process to block 510 where data is output to indicate the occurrence of an error in the simulation. Such data may indicate the signal identifiers, signal values, and different quantization times. If the quantization times and the signal values of the baseline event data and the replay event data match, the process is directed to decision block 512 to determine whether or not there is more event data to be processed in the baseline events file. If there is more event data, the process returns to block 502 to get unprocessed event data from the baseline events file. Otherwise, data is output at block 514 indicating that the module simulated correctly.

The snapback approach may not be suitable for all design scenarios. For example, if the ports on the module are clocked asynchronously, or clocked synchronously but not at integer multiples of one another, it is not possible to find a single $\Delta$ value with which to quantize the events. Eventually, a false miscompare will result once the timing of events drifts so that the events occur on either side of a quantization time. However, it should be appreciated that many different cores may be simulated purely synchronously or with clock signals that are integer multiples of one another. Also, the quantization time may be configured according to the anticipated amount of the drift in signal timestamps in simulations in subsequent stages of the design flow relative to the initial simulation.

As an alternative to use of a quantization time, FIGS. 6 and 7 show an approach in which the comparison process uses a search window to look for matching event data. FIG. 6 is a timing diagram that shows how a window of time is used to determine whether events described in the baseline events file match corresponding events described in the replay events file. For each event described in the baseline events file, a search window is defined ahead of that event, and a corresponding event is expected to have occurred within that search window. FIG. 6 shows event $e1_b$ as having occurred at time $t_p$, and corresponding event $e1_r$ as having taken on three different signal states at times $t_q$, $t_{q+1}$, and $t_{q+2}$. The matching process uses a search window that ranges from the time of an event described in the baseline events file, time $t_p$, to time $t_{p+x}$. The event data for the latest occurring corresponding event ($e1_r$ at $t_{q+2}$) in this window is used to compare to the event data for event $e1_b$.

The width of the search window (i.e., x) may be selected based on the maximum number of logic levels in the core and the anticipated assignment delay properties of the target hardware. Also, the worst case path may be used in determining the size of the window. As the approach is applied in successive phases of the implementation flow, it is possible to recover more precise information about logic levels from the implementation tools and further tune the width of the search window to reduce the possibility of miscomparisons.

FIG. 7 is a flowchart of a process in which a window of time is used to determine whether events described in the baseline events file match corresponding events described in the replay events file. At block 602, the data that describes an event in the baseline events file is obtained. At block 604, the process retrieves event data for the corresponding event described in the replay events file. The event data retrieved from the replay events file is for the event that corresponds to the event data retrieved from the baseline events file and that is the latest occurring corresponding event within the search window that begins at the time of the event from the baseline events file.

Decision block 606 determines whether or not the event data retrieved from the baseline events file is equivalent to the event data retrieved from the replay events file. If not, decision block 606 directs the process to block 608 where data is output to indicate the occurrence of an error in the simulation. Such data may indicate the signal identifiers and signal values. If the event data matches, the process is directed to decision block 610 to determine whether or not there is more event data to be processed in the baseline events file. If there is more event data, the process returns to block 602 to get unprocessed event data from the baseline events file. Otherwise, data is output at block 612 indicating that the module simulated correctly.

Figure 8:
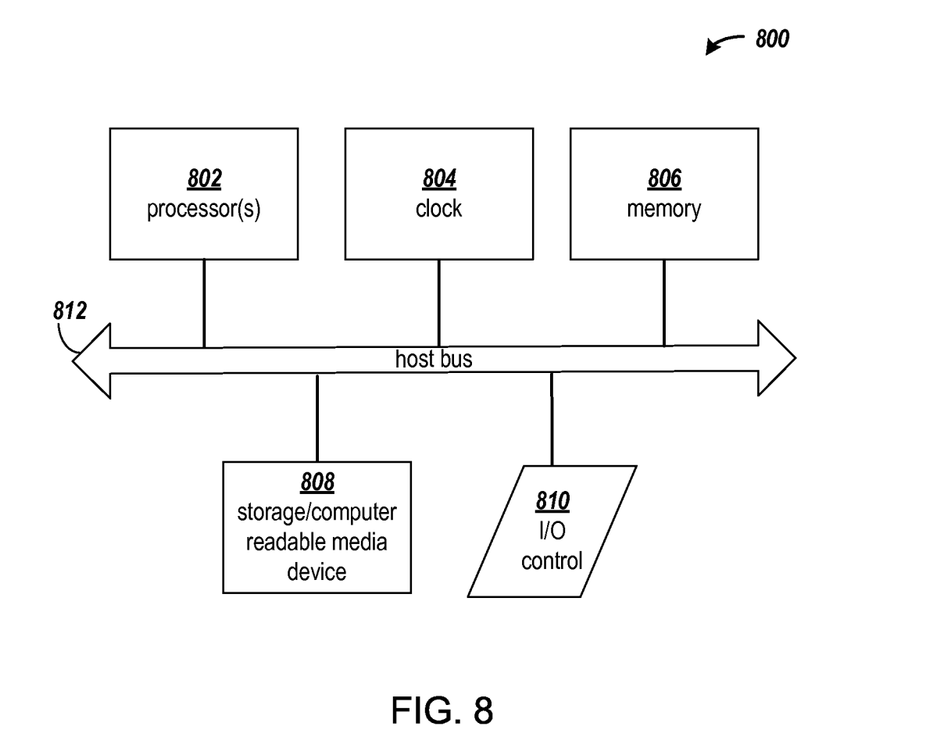
FIG. 8 shows a block diagram of an example computing arrangement that may be configured to implement the data structures and processes described herein.

FIG. 8 shows a block diagram of an example computing arrangement that may be configured to implement the data structures and perform the operations of the processes described herein. It will be appreciated that various alternative computing arrangements, including one or more processors and a memory arrangement configured with program code, would be suitable for hosting the disclosed processes and data structures. The computer code, which implements the disclosed processes, is encoded in a processor executable format and may be stored and provided via a variety of computer-readable storage media or delivery channels such as magnetic or optical disks or tapes, electronic storage devices, or as application services over a network.

Processor computing arrangement 800 includes one or more processors 802, a clock signal generator 804, a memory arrangement 806, a storage arrangement 808, and an input/output control unit 810, all coupled to a host bus 812. The arrangement 800 may be implemented with separate components on a circuit board or may be implemented internally within an integrated circuit. When implemented internally within an integrated circuit, the processor computing arrangement is otherwise known as a microcontroller.

The architecture of the computing arrangement depends on implementation requirements as would be recognized by those skilled in the art. The processor(s) 802 may be one or more general purpose processors, or a combination of one or more general purpose processors and suitable co-processors, or one or more specialized processors (e.g., RISC, CISC, pipelined, etc.).

The memory arrangement 806 typically includes multiple levels of cache memory, and a main memory. The storage arrangement 808 may include local and/or remote persistent storage, such as provided by magnetic disks (not shown), flash, EPROM, or other non-volatile data storage. The storage unit may be read or read/write capable. Further, the memory arrangement 806 and storage arrangement 808 may be combined in a single arrangement.

The processor(s) 802 executes the software in storage arrangement 808 and/or memory arrangement 806, reads data from and stores data to the storage arrangement 808 and/or memory arrangement 806, and communicates with external devices through the input/output control arrangement 810. These functions are synchronized by the clock signal generator 804. The resource of the computing arrangement may be managed by either an operating system (not shown), or a hardware control unit (not shown).

Though aspects and features may in some cases be described in individual figures, it will be appreciated that features from one figure can be combined with features of another figure even though the combination is not explicitly shown or explicitly described as a combination.

The methods and system are thought to be applicable to a variety of systems for simulation of a circuit design. Other aspects and features will be apparent to those skilled in the art from consideration of the specification. It is intended that the specification and drawings be considered as examples only, with a true scope of the invention being indicated by the following claims.

What is claimed is:

1. A method of testing a module of a circuit design, comprising:
    simulating the module a first time using a testbench on a programmed processor;
    capturing event data to a first file during the simulating, for each event the event data describing a signal identifier, an associated signal value, and an associated timestamp; and
    transforming the event data of the first file into a hardware description language (HDL) replay module that drives input signals to the module of the circuit design, wherein the transforming includes the programmed processor:
        selecting data from the first file for translation into the replay module;
        writing HDL statements that recreate port transition events of the first file in the replay module; and
        inserting delay statements into the replay module for retaining timing of events of the first file.

2. The method of claim 1, further comprising configuring the module with a set of values for parameters of the module prior to the simulating.

3. The method of claim 2, wherein the simulating includes inputting constrained random values of signals to the module.

4. The method of claim 1, further comprising:
    simulating the module a second time using the replay module;
    capturing event data to a second file during the second simulating;
    determining whether or not the event data in the first file matches the event data in the second file; and
    outputting data indicative of whether or not the event data in the first file matches the event data in the second file.

5. The method of claim 4, wherein the determining whether or not the event data in the first file matches the event data in the second file includes:
- determining respective quantization times for events indicated in the first file and events indicated in the second file; and
- determining whether for each event indicated in the first file, a corresponding event indicated in the second file has a same quantization time.

6. The method of claim 4, wherein the determining whether or not the event data in the first file matches the event data in the second file includes:
- for each event described in the first file,
  - defining a window of time that commences with a time indicated by the timestamp associated with the event described in the first file; and
  - determining whether or not an event described in the second file, having an associated signal identifier equivalent to the signal identifier associated with the event described in the first file, and having an associated timestamp that is within the window of time and that is later than the timestamp associated with any other event having an associated signal identifier equivalent to the signal identifier associated with the event described in the first file, has an associated signal value equal to the signal value associated with the event described in the first file.

7. The method of claim 1, further comprising:
- synthesizing the module into a module netlist after the transforming of the event data of the first file into the HDL replay module;
- simulating the module netlist using the replay module;
- capturing event data to a second file during the simulating of the module netlist;
- determining whether or not the event data in the first file matches the event data in the second file; and
- outputting data indicative of whether or not the event data in the first file matches the event data in the second file.

8. The method of claim 1, further comprising:
- synthesizing the module into a module netlist after the transforming of the event data of the first file into the HDL replay module;
- optimizing the module netlist into an optimized module;
- simulating the optimized module using the replay module;
- capturing event data to a second file during the simulating of the optimized module;
- determining whether or not the event data in the first file matches the event data in the second file; and
- outputting data indicative of whether or not the event data in the first file matches the event data in the second file.

9. The method of claim 1, further comprising:
- synthesizing the module into a module netlist after the transforming of the event data of the first file into the HDL replay module;
- optimizing the module netlist into an optimized module;
- placing the optimized module, resulting in a placed module;
- simulating the placed module using the replay module;
- capturing event data to a second file during the simulating of the placed module;
- determining whether or not the event data in the first file matches the event data in the second file; and
- outputting data indicative of whether or not the event data in the first file matches the event data in the second file.

10. The method of claim 1, further comprising:
- synthesizing the module into a module netlist after the transforming of the event data of the first file into the HDL replay module;
- optimizing the module netlist into an optimized module;
- placing the optimized module, resulting in a placed module;
- routing the placed module, resulting in a routed module;
- simulating the routed module using the replay module;
- capturing event data to a second file during the simulating of the routed module;
- determining whether or not the event data in the first file matches the event data in the second file; and
- outputting data indicative of whether or not the event data in the first file matches the event data in the second file.

11. A system for testing a module of a circuit design, comprising:
- a processor;
- a memory arrangement coupled to the processor and configured with program code, the program code when executed by the processor, causing the processor to perform operations including:
  - simulating the module a first time;
  - capturing event data to a first file during the simulating;
  - transforming the event data of the first file into a hardware description language (HDL) replay module, wherein the transforming includes:
    - selecting data from the first file for translation into the replay module;
    - writing HDL statements that recreate port transition events of the first file in the replay module; and
    - inserting delay statements into the replay module for retaining timing of events of the first file; and
  - simulating the module in subsequent implementation phases using the replay module to drive input signals to the module of the circuit design.

12. The system of claim 11, the operations further including configuring the module with a set of values for parameters of the module prior to the simulating.

13. The system of claim 12, wherein the simulating includes inputting constrained random values of signals to the module.

14. The system of claim 11, the operations further including:
- simulating the module a second time using the replay module;
- capturing event data to a second file during the second simulating;
- determining whether or not the event data in the first file matches the event data in the second file; and
- outputting data indicative of whether or not the event data in the first file matches the event data in the second file.

15. The system of claim 14, wherein the determining whether or not the event data in the first file matches the event data in the second file includes:
- determining respective quantization times for events indicated in the first file and events indicated in the second file; and
- determining whether for each event indicated in the first file, a corresponding event indicated in the second file has a same quantization time.

16. The system of claim 14, wherein:
- for each event, the event data describes a signal identifier, an associated signal value, and an associated timestamp; and the determining whether or not the event data in the first file matches the event data in the second file includes:

for each event described in the first file, defining a window of time that commences with a time indicated by the timestamp associated with the event described in the first file; and determining whether or not an event described in the second file, having an associated signal identifier equivalent to the signal identifier associated with the event described in the first file, and having an associated timestamp that is within the window of time and that is later than the timestamp associated with any other event having an associated signal identifier equivalent to the signal identifier associated with the event described in the first file, has an associated signal value equal to the signal value associated with the event described in the first file.

17. The system of claim 11, the operations further including:

synthesizing the module into a module netlist after the transforming of the event data of the first file into the HDL replay module;

simulating the module netlist using the replay module;

capturing event data to a second file during the simulating of the module netlist;

determining whether or not the event data in the first file matches the event data in the second file; and outputting data indicative of whether or not the event data in the first file matches the event data in the second file.

18. The system of claim 11, the operations further including:

synthesizing the module into a module netlist after the transforming of the event data of the first file into the HDL replay module;

optimizing the module netlist into an optimized module;

simulating the optimized module using the replay module;

capturing event data to a second file during the simulating of the optimized module;

determining whether or not the event data in the first file matches the event data in the second file; and outputting data indicative of whether or not the event data in the first file matches the event data in the second file.

19. The system of claim 11, the operations further including:

synthesizing the module into a module netlist after the transforming of the event data of the first file into the HDL replay module;

optimizing the module netlist into an optimized module;

placing the optimized module, resulting in a placed module;

simulating the placed module using the replay module;

capturing event data to a second file during the simulating of the placed module;

determining whether or not the event data in the first file matches the event data in the second file; and outputting data indicative of whether or not the event data in the first file matches the event data in the second file.

20. The system of claim 11, the operations further including:

synthesizing the module into a module netlist after the transforming of the event data of the first file into the HDL replay module;

optimizing the module netlist into an optimized module;

placing the optimized module, resulting in a placed module;

routing the placed module, resulting in a routed module;

simulating the routed module using the replay module;

capturing event data to a second file during the simulating of the routed module;

determining whether or not the event data in the first file matches the event data in the second file; and outputting data indicative of whether or not the event data in the first file matches the event data in the second file.

* * * * *